US009556821B2

(12) United States Patent
Hirata et al.

(10) Patent No.: US 9,556,821 B2
(45) Date of Patent: *Jan. 31, 2017

(54) PISTON STRUCTURE FOR ENGINE

(71) Applicant: Mazda Motor Corporation, Aki-gun, Hiroshima (JP)

(72) Inventors: Koichi Hirata, Hiroshima (JP);
Mitsutaka Yamaya, Aki-gun (JP);
Shuji Takuma, Hiroshima (JP);
Yasunori Kanda, Hiroshima (JP);
Tatsuya Kobayashi, Hiroshima (JP);
Takeshi Motomuro, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 198 days.

This patent is subject to a terminal disclaimer.

(21) Appl. No.: 14/464,543

(22) Filed: Aug. 20, 2014

(65) Prior Publication Data

US 2015/0075478 A1    Mar. 19, 2015

(30) Foreign Application Priority Data

Sep. 18, 2013   (JP) ................................. 2013-192758
Feb. 6, 2014    (JP) ................................. 2014-020966

(51) Int. Cl.
    *F16J 1/14*    (2006.01)
    *F02F 3/00*    (2006.01)
    (Continued)

(52) U.S. Cl.
    CPC ............ *F02F 3/0069* (2013.01); *F02B 75/06* (2013.01); *F02F 3/0084* (2013.01); *F16J 1/16* (2013.01)

(58) Field of Classification Search
    CPC ........... F02F 3/0069; F02F 3/0084; F16J 1/16; F16J 1/18; F16J 1/14; F02B 75/06
    (Continued)

(56) References Cited

U.S. PATENT DOCUMENTS 3,058,792 A * 10/1962 Elford ........................ F16J 1/04
                                                          403/155
4,964,332 A * 10/1990 Sawyer ...................... F16J 1/18
                                                          123/193.6
(Continued)

FOREIGN PATENT DOCUMENTS

GB         239203 A     2/1926
JP       59181248 U    12/1984
(Continued)

OTHER PUBLICATIONS

Japanese Patent Office, International Search Report of PCT/JP2013/004814, Sep. 10, 2013, 4 pages.
(Continued)

*Primary Examiner* — Marguerite McMahon
(74) *Attorney, Agent, or Firm* — Alleman Hall McCoy Russell & Tuttle LLP

(57) ABSTRACT

A piston structure for an engine is provided. The piston structure includes a piston for reciprocating within a cylinder, a connecting rod having a smaller-end part and a larger-end part in both ends, respectively, the smaller-end part coupled to the piston, the larger-end part coupled to a crankshaft, a cross-sectionally hollow piston pin coupling the piston to the smaller-end part, and a dynamic absorber provided inside the piston pin, including a fixed part fixed to the piston pin and a movable part pivotally supported by the fixed part, and for suppressing the piston, the piston pin, and the smaller-end part from integrally resonating with respect to the larger-end part of the connecting rod on combustion stroke. The dynamic absorber includes an assemblable dynamic absorber in which the movable part is formed by attaching a mass adjusting part to the fixed part.

19 Claims, 12 Drawing Sheets

(51) Int. Cl.
  *F16J 1/16* (2006.01)
  *F02B 75/06* (2006.01)
(58) Field of Classification Search
  USPC .......................................... 123/193.6; 92/187
  See application file for complete search history.

(56) References Cited

U.S. PATENT DOCUMENTS

| | | | | |
|---|---|---|---|---|
| 5,327,813 | A * | 7/1994 | DeBell | F16J 1/16 123/193.6 |
| 5,709,184 | A * | 1/1998 | Ali | F16J 1/16 123/193.6 |
| 6,923,153 | B2 * | 8/2005 | Rein | B22F 5/008 123/193.6 |
| 2015/0075479 | A1 * | 3/2015 | Hirata | F02F 3/0069 123/193.6 |

FOREIGN PATENT DOCUMENTS

| | | |
|---|---|---|
| JP | 60154663 U | 10/1985 |
| JP | 62163365 U | 10/1987 |
| JP | H0623606 A | 2/1994 |
| JP | 07054996 A | 2/1995 |
| JP | H0979314 A | 3/1997 |
| JP | 2004353500 A | 12/2004 |
| JP | 2004353816 A | 12/2004 |
| JP | 2006322516 A | 11/2006 |
| WO | 2014034034 A1 | 3/2014 |

OTHER PUBLICATIONS

Masaya Otsuka, "How to Minimize Diesel Combustion Noise by Improving Engine Structure," Proceedings of Society of Automotive Engineers Convention, No. 36-05, Society of Automotive Engineers of Japan, Inc., May 2005, p. 7-10.

* cited by examiner

PISTON STRUCTURE FOR ENGINE

BACKGROUND

The present invention relates to a piston structure for an engine, in which the piston is coupled to a smaller end part of a connecting rod by a piston pin.

Generally, in engines installed in vehicles (e.g., automobiles), a piston is coupled to a smaller end part of a connecting rod by a piston pin. Specifically, the piston pin is inserted through a pin insertion hole formed in the smaller end part of the connecting rod, and the smaller end part of the connecting rod is located in a central area of the piston pin in its axial directions. Two boss parts are formed in a bottom face of the piston (the face opposite to a top face), at positions corresponding to both end portions of the piston pin in the axial directions so as to sandwich the smaller end part of the connecting rod therebetween. The two boss parts are formed with pin supporting holes into which both the end portions of the piston pin in the axial directions are inserted and for supporting both the end portions, respectively (e.g., see JP2004-353500A).

Such engines having the above configuration are known to cause combustion noises due to resonance caused depending on a basic structure of the engine (e.g., see Masaya Otsuka, "How to Minimize Diesel Combustion Noise by Improving Engine Structure," Proceedings of Society of Automotive Engineers Convention, No. 36-05, Society of Automotive Engineers of Japan, Inc. May 2005, P. 7-10). In "How to Minimize Diesel Combustion Noise by Improving Engine Structure," it is described that the engine sound has three peaks at 1.7 kHz, 3.3 kHz, and 6 kHz. One of these peaks (3.3 kHz) is caused by stretching resonance of the connecting rod, and the amplitude of this resonance can hardly be reduced.

Note that the present invention has a related earlier application (JP2012-189134).

The present inventors have studied for spring mass models for pistons and connecting rods, and as a result, they have found out the followings.

In spring mass models for pistons and connecting rods, a piston, a piston pin, and a smaller end part of a connecting rod correspond to a mass point (wherein the mass is M (unit: kg)) as a whole, and a coupling part of the connecting rod coupling the smaller end part and a larger end part thereof corresponds to a spring (wherein the spring constant is K (unit: N/m)) supporting the mass point at the larger end part. Thus, if the piston, the piston pin, and the smaller end part of the connecting rod act integrally, these components integrally resonate with respect to the larger end part of the connecting rod at a resonance frequency of $(1/2\pi) \times (K/M)^{1/2}$ Hz (e.g., 3 kHz-4 kHz). This resonance corresponds to the stretching resonance of the connecting rod described above.

Meanwhile, a lubricant film is formed between the piston pin and the pin insertion hole of the connecting rod. The lubricant film corresponds to the spring coupling the piston pin to the smaller end part of the connecting rod. Moreover, in a case where a full floating type assembly, in which the piston pin is turnable with respect to all the boss parts and the smaller end part of the connecting rod, is adopted, in addition to between the piston pin and the pin insertion hole of the connecting rod, lubricant films are also formed between the piston pin and each of the pin supporting holes of the boss parts of the piston. The lubricant films correspond to the springs coupling the piston pin to the piston.

With the lubricant film between the piston pin and the pin insertion hole of the connecting rod (in the full floating type, this lubricant film and the lubricant films between the piston pin and the pin supporting holes of the boss parts of the piston), the piston is supported by the smaller end part of the connecting rod via the spring, and the piston, the piston pin, and the smaller end part of the connecting rod do not integrally resonate with respect to the larger end part of the connecting rod. Since the piston is not pushed with a strong force except for on combustion stroke (expansion stroke), the lubricant film remains, and thereby, the resonance does not occur.

On the other hand, on the combustion stroke, since the piston is pushed with a strong force, the lubricant film is eliminated, and as a result, the piston, the piston pin, and the smaller end part of the connecting rod integrally resonate with respect to the larger end part of the connecting rod.

From these point of views, since the piston, the piston pin, and the smaller end part of the connecting rod become integral on the combustion stroke, it can be considered to utilize a dynamic absorber in order to suppress the resonance (reduce vibration at the resonance frequency). However, by simply providing the dynamic absorber, although the noises due to the resonance can be reduced on the combustion stroke, the noises increase due to the vibration of the dynamic absorber on other strokes where the piston, the piston pin, and the smaller end part of the connecting rod do not become integral.

SUMMARY

The present invention is made in view of the above situations and aims to suppress integral resonation of a piston, a piston pin, and a smaller end part of a connecting rod with respect to a larger end part of the connecting rod on combustion stroke, and to suppress an increase of noises on other strokes.

According to one aspect of the invention, a piston structure for an engine is provided. The piston structure includes a piston for reciprocating within a cylinder, a connecting rod having a smaller-end part and a larger-end part in both ends, respectively, the smaller-end part coupled to the piston, the larger-end part coupled to a crankshaft, a cross-sectionally hollow piston pin coupling the piston to the smaller-end part, and a dynamic absorber provided inside the piston pin, including a fixed part fixed to the piston pin and a movable part pivotally supported by the fixed part, and for suppressing the piston, the piston pin, and the smaller-end part from integrally resonating with respect to the larger-end part of the connecting rod on combustion stroke.

The dynamic absorber includes an assemblable dynamic absorber in which the movable part is formed by attaching a mass adjusting part to the fixed part.

According to such a piston structure for the engine described above, in a case where a lubricant film between the piston pin and the connecting rod (in a full-floating type, this lubricant film and a lubricant film between the piston pin and the piston) is eliminated on the combustion stroke and the piston, the piston pin, and the smaller-end part of the connecting rod become integral, the dynamic absorber can suppress the integral resonance thereof. Moreover, since the dynamic absorber is provided to the piston pin, in a case where the lubricant film exists between the piston pin and the connecting rod, in other words, on intake stroke, compression stroke, and exhaust stroke, the lubricant film (spring) prevents vibration of the dynamic absorber from being transmitted to the connecting rod, and thus, noises do not increase due to the vibration. Moreover, by providing the dynamic absorber inside the piston pin, the space can effectively be utilized and a size increase of the piston is not required.

Additionally, since the dynamic absorber includes the assemblable dynamic absorber in which the movable part is formed by attaching the mass adjusting part to the fixed part, a mass of the movable part can be adjusted by exchanging the mass adjusting part, which is more user friendly, for example, in fixing manufacturing error.

Specifically, the dynamic absorber may include two dynamic absorbers. The two dynamic absorbers may be located sandwiching therebetween a face passing the center of the piston pin in an axial direction thereof.

Thus, a stable mass balance can be obtained.

For example, one of the dynamic absorbers may be the assemblable dynamic absorber and the other dynamic absorber may be an integrated dynamic absorber in which the fixed part and the movable part are formed integrally, or both of the dynamic absorbers may be the assemblable dynamic absorbers.

In either case, a frequency adjustment can be performed by adjusting the mass of the movable part.

More specifically, the fixed part may have a shaft extending in an axial direction of the piston pin. The mass adjusting part may have an insertion hole into which the shaft is inserted. The mass adjusting part may be attached to the fixed part by inserting the shaft into the insertion hole.

Further, an axial positioning part for positioning the mass adjusting part with respect to the shaft may be provided between the insertion hole and the shaft.

Thus, the positioning of the mass adjusting part can be performed highly accurately, and the frequency can be set stably.

In this case, the axial positioning part is preferred to include a restricting face provided to the shaft to face an inserting direction of the mass adjusting part, and a contact face for contacting with the restricting face and provided to the mass adjusting part. The restricting face is preferred to be located on a tip end side of the shaft.

Thus, the diameter of the shaft can be avoided from becoming small, and therefore, the frequency can be set more stably.

A retaining part for preventing the mass adjusting part from being removed from the shaft is preferred to be provided between the mass adjusting part and a protruding tip end part formed in the shaft to protrude beyond the mass adjusting part.

Thus, the removal of the mass adjusting part from the shaft can surely be prevented.

The retaining part may be structured by attaching a fixed clip to the protruding tip end part.

In this case, the retaining part can be structured with a simple configuration while using an existing member.

Moreover, the retaining part may be formed by crimping either one of the protruding tip end part and the mass adjusting part.

This is advantageous in that increases in assembly work and the number of components can be avoided.

For example, in the case where the retaining part is formed by crimping the mass adjusting part, the retaining part is preferred to include a crimped part formed by crimping the mass adjusting part, and an inhibiting part provided in an outer face of the shaft so as to be in contact with the crimped part when the mass adjusting part is displaced in a removing direction thereof.

Thus, the function of the retaining part can effectively be improved.

Also in this case, a restricting face facing in an inserting direction of the mass adjusting part and for contacting with the mass adjusting part may be formed in the shaft at a position near the retaining part, and closer to a base end side of the shaft than the retaining part.

Thus, the restricting face can bear the load added to the retaining part during the crimping, and the mass adjusting part can be supported stably.

Note that the attaching of the fixed clip to the protruding tip end part may become available when the mass adjusting part is positioned with the shaft.

Thus, the positioning of the mass adjusting part can be performed highly accurately, and the confirmation thereof becomes easy.

DETAILED DESCRIPTION OF EMBODIMENT

Hereinafter, one embodiment of the present invention is described in detail with reference to the appended drawings.

Figure 1:
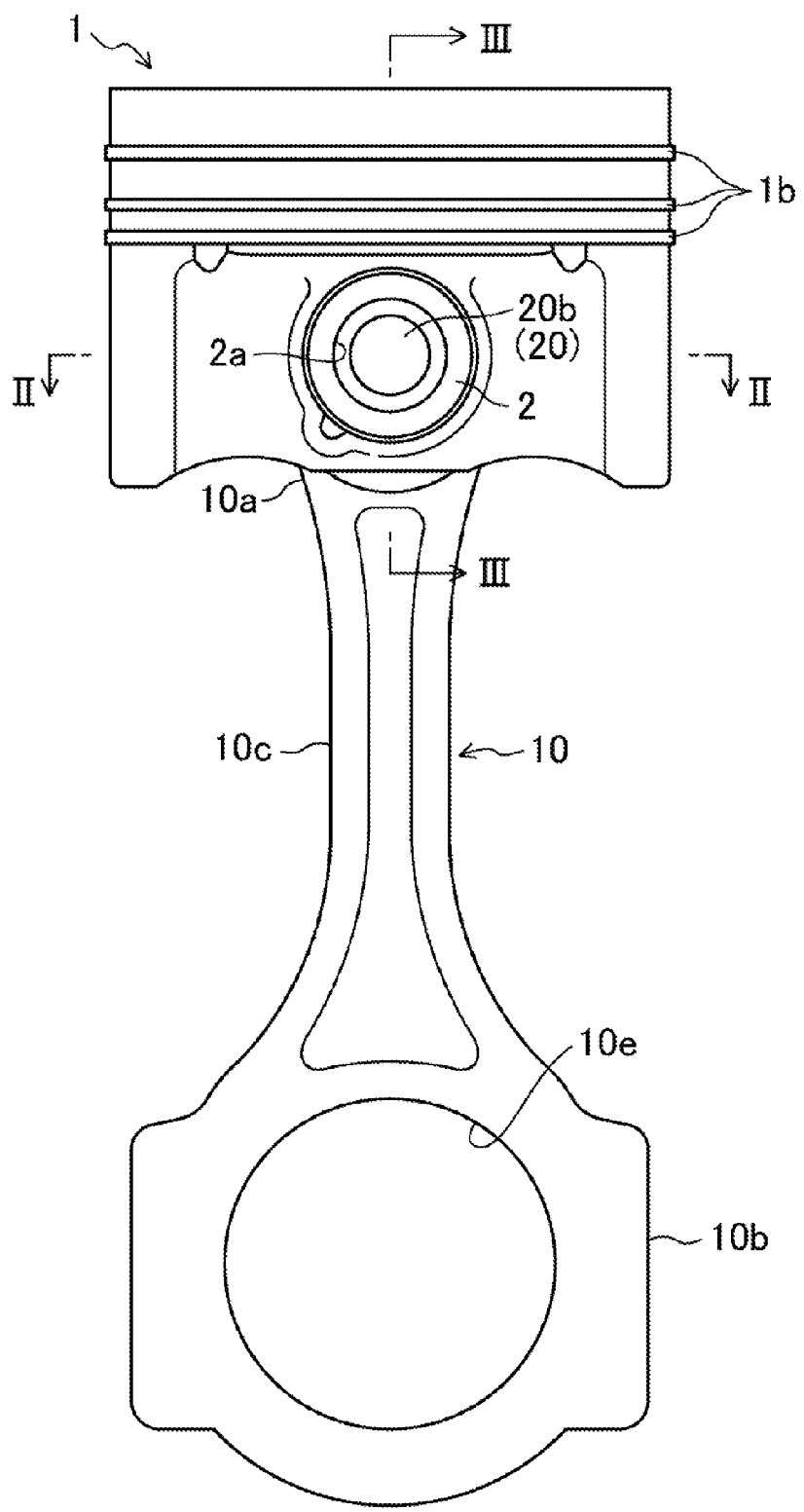
FIG. 1 is a view illustrating a piston and a connecting rod of an engine to which a piston structure according to an embodiment of the present invention is adopted.
Figure 2:
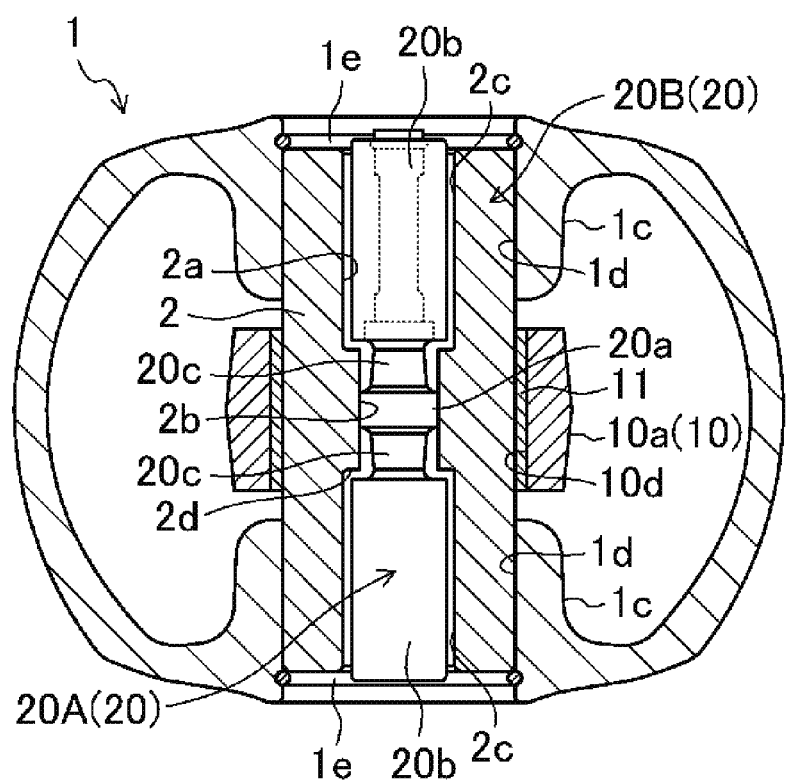
FIG. 2 is a cross-sectional view taken along a line II-II in FIG. 1 (a dynamic absorber is illustrated non-cross-sectionally).
Figure 3:
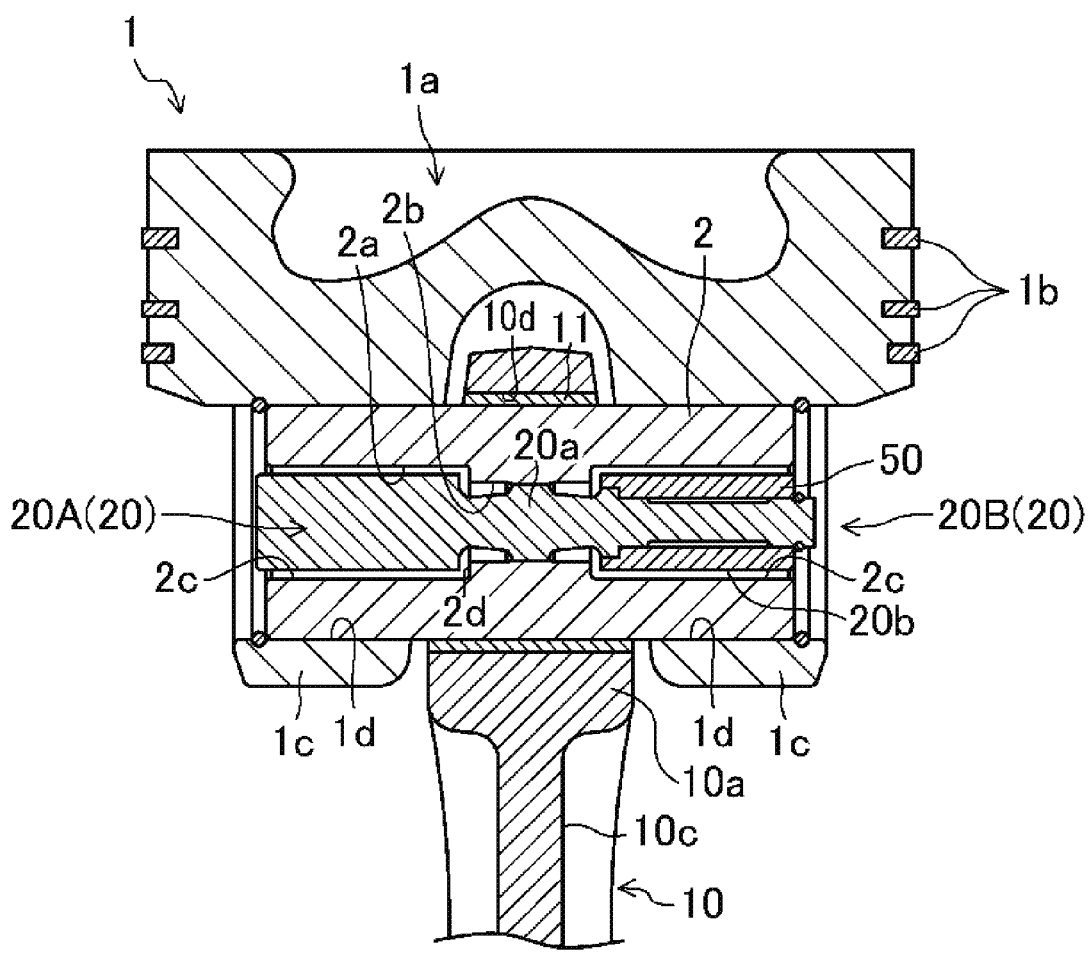
FIG. 3 is a cross-sectional view taken along a line III-III in FIG. 1.

FIGS. 1 to 3 illustrate a piston 1 and a connecting rod 10 of an engine to which a piston structure according to this embodiment of the present invention is adopted. The piston 1 reciprocates in a cylinder in axial directions of the cylinder (up-and-down directions in FIGS. 1 and 3) by repeating a cylinder cycle (intake stroke, compression stroke, combustion stroke (expansion stroke), and exhaust stroke).

The piston 1 is coupled to a smaller end part 10a that is one end part of the connecting rod 10, via a piston pin 2. A larger end part 10b that is the other end part of the connecting rod 10 is coupled to a crankshaft (not illustrated). The smaller and larger end parts 10a and 10b of the connecting rod 10 are coupled to each other by a column-like coupling part 10c. The reciprocation of the piston 1 is transmitted to the crankshaft via the connecting rod 10 to rotate the crankshaft. Axial directions of the piston pin 2 (left-and-right directions in FIG. 3) match with axial directions of the crankshaft.

The smaller end part 10*a* of the connecting rod 10 is formed with a pin insertion hole 10*d* through which the piston pin 2 is inserted, and the larger end part 10*b* of the connecting rod 10 is formed with a shaft insertion hole 10*e* through which the crankshaft is inserted. Note that although it is omitted in FIG. 1, the larger end part 10*b* of the connecting rod 10 is divided into two pieces at a central position of the shaft insertion hole 10*e* in a longitudinal direction of the coupling part 10*c*.

The piston pin 2 is inserted through the pin insertion hole 10*d* of the smaller end part 10*a* of the connecting rod 10, and the smaller end part 10*a* of the connecting rod 10 is located in a central area of the piston pin 2 in its axial directions. Moreover, the smaller end part 10*a* of the connecting rod 10 is located in a central area of the piston 1 in the axial directions of the piston pin 2.

The piston pin 2 is turnably inserted through the pin insertion hole 10*d* of the connecting rod 10. Note that a bush 11 is fixed to an inner face of the pin insertion hole 10*d* of the connecting rod 10, and to be more precise, the piston pin 2 is inserted to be turnable with respect to the bush 11.

A lubricant circulating within the engine is supplied between the piston pin 2 and the pin insertion hole 10*d* of the connecting rod 10 (specifically, the bush 11) to form a lubricant film, and the lubricant film and the bush 11 enable the piston pin 2 to smoothly turn within the pin insertion hole 10*d* of the connecting rod 10.

A cavity 1*a* is formed in a top face of the piston 1, and annular piston rings 1*b* are fitted into a part of an outer circumferential face of the piston 1, at a position higher than the piston pin 2.

Two boss parts 1*c* are formed in a bottom face of the piston 1 (the face opposite to the top face) to bulge toward the crankshaft side, at positions corresponding to both end portions of the piston pin 2 in the axial directions so as to sandwich the smaller end part 10*a* of the connecting rod 10 therebetween. The two boss parts 1*c* are each formed with a pin supporting hole 1*d* extending in the axial directions of the piston pin 2. Both the end portions of the piston pin 2 in the axial directions are supported by being inserted into the pin supporting holes 1*d* of the two boss parts 1*c*, respectively.

In this embodiment, a full floating type assembly is adopted for the piston pin 2. Specifically, the piston pin 2 is turnable within the pin insertion hole 10*d* of the connecting rod 10 and is also turnable within the pin supporting hole 1*d* of the boss part 1*c* of the piston 1.

Similarly to between the piston pin 2 and the pin insertion hole 10*d* of the connecting rod 10, lubricant films are also formed between the piston pin 2 and the pin supporting holes 1*d* of the boss parts 1*c* of the piston 1, and these lubricant films enable the piston pin 2 to smoothly turn within the pin supporting holes 1*d* of the boss parts 1*c* of the piston 1.

A snap ring 1*e* is inserted into each of the pin supporting holes 1*d* of the two boss parts 1*c* and fixed in each of end sections thereof on the outer circumferential face side of the piston 1, and the two snap rings 1*e* are located to contact with both end faces of the piston pin 2 in the axial directions, so as to restrict a movement of the piston pin 2 in the axial directions.

The piston pin 2 is hollow in its cross section, and a penetration hole 2*a* extending in the axial directions of the piston pin 2 is formed in a central area of the piston pin 2 in its radial directions. A press-fit portion 2*b* into which a fixed part 20*a* of a dynamic absorber 20 (described later) is press-fitted is formed in an inner circumferential face of the penetration hole 2*a*, in the central portion of the piston pin 2 in the axial directions. The inner diameter of the penetration hole 2*a* at the press-fit portion 2*b* is smaller than that of the other part of the penetration hole 2*a*.

Specifically, the penetration hole 2*a* has the press-fit portion 2*b* located in the central portion of the piston pin 2 in the axial directions and formed into a cylindrical shape having a small diameter, and accommodating portions 2*c* continuing from both sides of the press-fit portion 2*b*, located at both the end portions of the piston pin 2 in the axial directions, and formed into a cylindrical shape having a large diameter.

A step face 2*d* facing the axial directions of the piston pin 2 is formed by a step between the press-fit portion 2*b* and the accommodating portion 2*c*. The rigidity of the piston pin 2 can be improved by making the diameter of the press-fit portion 2*b* small.

Inside the piston pin 2 (within the penetration hole 2*a*), two dynamic absorbers 20 are provided to suppress the piston 1, the piston pin 2, and the smaller end part 10*a* of the connecting rod 10 from integrally resonating with respect to the larger end part 10*a* of the connecting rod 10 on the combustion stroke. The two dynamic absorbers 20 are located on both sides of a face passing the center of the piston pin 2 in the axial directions (i.e., a face passing the center and perpendicular to the axis of the piston pin 2).

Figure 4:
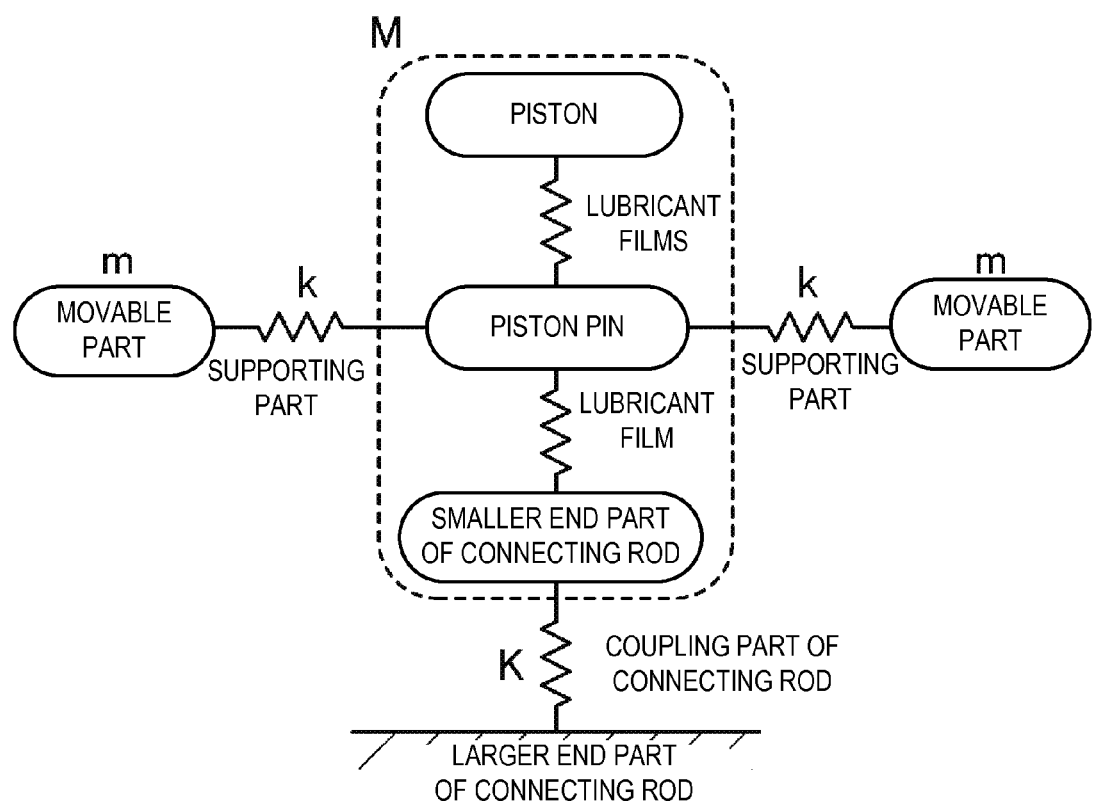
FIG. 4 is a view illustrating a spring mass model for the piston and the connecting rod.

Here, a spring mass model for the piston 1 and the connecting rod 10 is as illustrated in FIG. 4. Specifically, the piston 1, the piston pin 2, and the smaller end part 10*a* of the connecting rod 10 correspond to a mass point (wherein the mass is M (unit: kg)) as a whole, and the coupling part 10*c* of the connecting rod 10 corresponds to a spring (wherein the spring constant is K [unit: N/m]) supporting the mass point at the larger end part 10*b* of the connecting rod 10.

The lubricant film between the piston pin 2 and the pin insertion hole 10*d* of the connecting rod 10 corresponds to a spring coupling the piston pin 2 to the smaller end part 10*a* of the connecting rod 10, and the lubricant films between the piston pin 2 and the pin supporting holes 1*d* of the boss parts 1*c* of the piston 1 corresponds to springs coupling the piston pin 2 to the piston 1.

On the combustion stroke, since the piston 1 is pushed with a strong force, the lubricant film between the piston pin 2 and the pin insertion hole 10*d* of the connecting rod 10 (the spring coupling the piston pin 2 to the smaller end part 10*a* of the connecting rod 10) and the lubricant films between the piston pin 2 and the supporting holes 1*d* of the boss parts 1*c* of the piston 1 (the springs coupling the piston pin 2 to the piston 1) are all eliminated, and as a result, the piston 1, the piston pin 2, and the smaller end part 10*a* of the connecting rod 10 become integral. Thus, the piston 1, the piston pin 2, and the smaller end part 10*a* of the connecting rod 10 integrally resonate with respect to the larger end part 10*b* of the connecting rod 10 at a resonance frequency of $(1/2\pi) \times (K/M)^{1/2}$ Hz.

(Dynamic Absorber)

In order to suppress the resonance (reduce the vibration at the resonance frequency), the two dynamic absorbers 20 are provided inside the piston pin 2 (within the penetration hole 2*a*).

As illustrated in FIGS. 2 and 3, each dynamic absorber 20 includes the fixed part 20*a* fixed to the press-fit portion 2*b* formed in the inner circumferential face of the penetration hole 2*a* of the piston pin 2, a movable part 20*b* extending inside the piston pin 2 in the axial directions of the piston pin 2, and a supporting part 20c for supporting the movable part 20b to be vibratable with respect to the fixed part 20a in the radial directions of the piston pin 2.

In this embodiment, in view of reducing the number of members and the like, the two dynamic absorbers 20 are formed integrally. Further, in one of the dynamic absorbers 20, the fixed part 20a, the movable part 20b, and the supporting part 20c are integrally formed (integrated dynamic absorber 20A), and the other dynamic absorber 20 is an assembled-type dynamic absorber formed by assembling a plurality of members (assemblable dynamic absorber 20B).

The integrated dynamic absorber 20A and the assemblable dynamic absorber 20B are integrally coupled to each other at the respective fixed parts 20a. The integrated fixed parts 20a are press-fitted to be fixed to the press-fit portion 2b. Thus, the movable part 20b of the integrated dynamic absorber 20A is accommodated inside one of the accommodating portions 2c, and the movable part 20b of the assemblable dynamic absorber 20B is accommodated inside the other accommodating portion 2c.

Each movable part 20b is formed into a circular cylinder and is designed such that the outer diameter thereof becomes smaller than the inner diameter of the accommodating portion 2c so as not to contact with the inner circumferential face of the accommodating portion 2c even when the movable part 20b vibrates. In this manner, the movable part 20b is disposed inside the accommodating portion 2c such that an outer circumferential face of the movable part 20b faces the inner circumferential face of the accommodating portion 2c with a slight gap therebetween.

The outer diameter of the movable part 20b is larger than the inner diameter of the press-fit portion 2b. Therefore, an end face of the movable part 20b contacts with the step face 2d so that the movable part 20b cannot be inserted into the press-fit portion 2b.

The supporting part 20c is also formed into a circular cylinder and intervenes between the movable part 20b and the fixed part 20a. The outer diameter of the supporting part 10c is smaller than the outer diameter of the movable part 20b and the inner diameter of the press-fit portion 2b so that it can be inserted into the press-fit portion 2b.

In this manner, the supporting part 20c is disposed inside the press-fit portion 2b such that an outer circumferential face of the supporting part 20c faces an inner circumferential face of the press-fit portion 2b with a sufficient gap therebetween. Thus, the supporting part 20c supports the movable part 20b to be vibratable with respect to the fixed part 20a in the radial directions of the piston pin 2.

The fixed part 20a is also formed into a circular cylinder. The outer diameter of the fixed part 20a is smaller than the outer diameter of the movable part 20b but slightly larger than the inner diameter of the press-fit portion 2b, so that the fixed part 20a can be press-fitted into the press-fit portion 2b. The fixed part 20a, the movable part 20b, and the supporting part 20c are continuously arranged in line with axes thereof matched with each other.

The integrated dynamic absorber 20A and the assemblable dynamic absorber 20B are arranged such that the axes thereof are matched with the axis of the piston pin 2. Moreover, the two dynamic absorbers 20A and 20B have the movable parts 20b with substantially the same mass, and gravity points of the movable parts 20b of the two dynamic absorbers 20A and 20B are located on the axis of the piston pin 2 at positions symmetric with respect to the face passing the center of the piston pin 2 in the axial directions (i.e., the face passing the center and perpendicular to the axis of the piston pin 2).

(Assemblable Dynamic Absorber)

Figure 5:
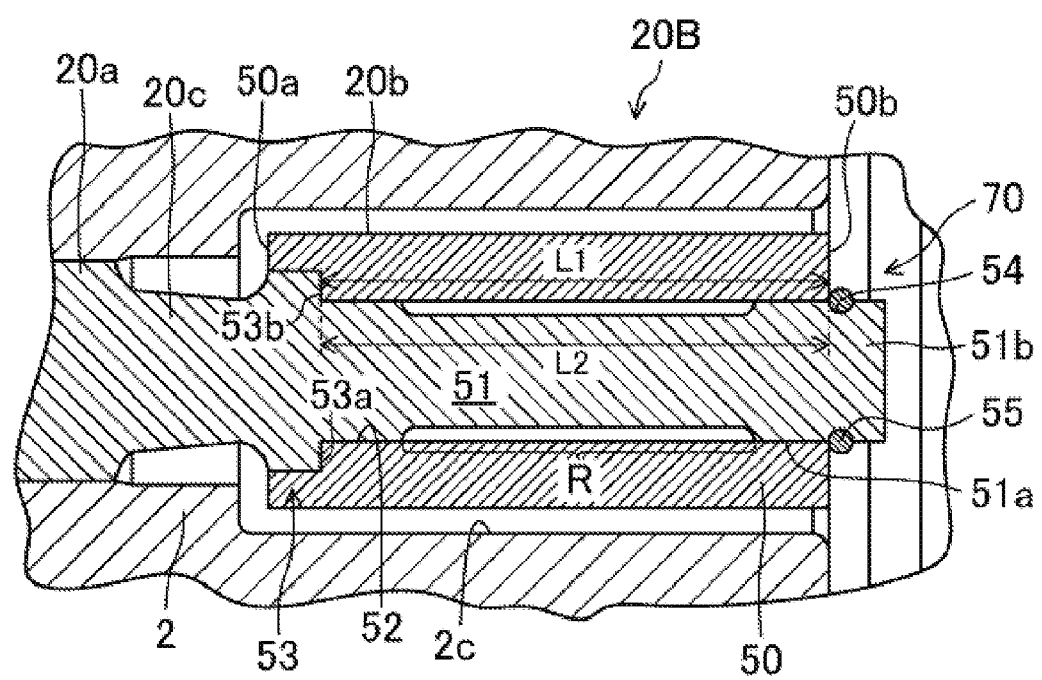
FIG. 5 is a partial enlarged-view of FIG. 3.

As illustrated in FIG. 5 in an enlarged manner, the movable part 20b of the assemblable dynamic absorber 20B is formed by attaching a mass adjusting part 50 to the fixed part 20a. Therefore, compared with the integrated dynamic absorber 20A, the assemblable dynamic absorber 20B can adjust the mass of the movable part 20b and is more user friendly, for example, in fixing manufacturing error.

The fixed part 20a of the assemblable dynamic absorber 20B has a shaft 51 extending in the axial directions of the piston pin 2. In the assemblable dynamic absorber 20B, a base part of the shaft 51 (a part continuing to the fixed part 20a) configures the supporting part 20c and a part of the shaft 51 closer to a tip end side than the base part is a mountable part 51a to which the mass adjusting part 50 is fixed. The outer diameters of the base part and the mountable part 51a are smaller than the inner diameter of the press-fit portion 2b so that the base part and the mountable part 51a can be inserted into the press-fit portion 2b.

The mass adjusting part 50 is comprised of a circular cylindrical member having substantially the same outer diameter as that of the movable part 20b, and it has an insertion hole 52 extending in the axial directions and penetrating between an inner end face 50a and an outer end face 50b. The shaft 51 is inserted into the insertion hole 52 from the inner end face 50a side. The insertion hole 52 is designed such that an internal dimension thereof becomes slightly smaller than an external dimension of the mountable part 51a, and the shaft 51 is press-fitted into the insertion hole 52. Thus, the mass adjusting part 50 is integrated with the shaft 51.

The mass adjusting part 50 is attached to the fixed part 20a by press-fitting the shaft 51 into the insertion hole 52. Here, an axial positioning part 53 is provided between the insertion hole 52 and the shaft 51 to position the mass adjusting part 50 with respect to the shaft 51.

In this embodiment, the axial positioning part 53 is located on the base end side of the shaft 51, specifically, the base end side of the mountable part 51a. The axial positioning part 53 is formed by a restricting face 53a provided to the shaft 51, and a contact face 53b provided to the mass adjusting part 50.

Specifically, an annular convex part is formed around the shaft 51 to bulge outward, and an annular concave part enlarging the insertion hole 52 is formed on the inner end face 50a side of the mass adjusting part 50. The annular convex part is formed with the restricting face 53a facing the direction in which the mass adjusting part 50 is inserted to press-fit the shaft 51 therein (the direction from right to left in FIG. 5, i.e., inserting direction), and the annular concave part is formed with the contact face 53b contacting with the restricting face 53a. Thus, as the mass adjusting part 50 is inserted to press-fit the shaft 51 therein, the contact face 53b hits the restricting face 53a. As a result, the mass adjusting part 50 is positioned at a predetermined position with respect to the shaft 51, and stable frequency setting can be performed.

In an intermediate section of the shaft 51 in the axial directions of the mountable part 51a, a non-pressure-contact area R that does not contact with the mass adjusting part 50 in the press-fitting is formed to improve the assembly workability. Therefore, in this embodiment, the shaft 51 partially contacts with the mass adjusting part 50 at two positions of a base end side position and a tip end side position of the mountable part 51a by the press-fitting.

When the mass adjusting part 50 is attached to the predetermined position of the shaft 51, a tip end part of the shaft 51 protrudes beyond the outer end face 50b of the mass adjusting part 50 (protruding tip end part 51b). A ring-like fitting groove 54 is formed in an outer circumferential face of the protruding tip end part 51b and is concave in circumferential directions of the protruding tip end part 51b, and a fixed clip 55 having a substantially C-shape is fitted into the fitting groove 54.

By attaching the fixed clip 55 to the protruding tip end part 51b as above, it can surely prevent the mass adjusting part 50 from being removed from the shaft 51 (retaining part 70).

The fixed clip 55 is preferred to be attachable when the mass adjusting part 50 is positioned by the axial positioning part 53. Specifically, dimension setting is performed such that a length L1 from the contact face 53b to the outer end face 50b and a length L2 from the restricting face 53a to the fitting groove 54 become substantially the same or the length L1 becomes slightly shorter than the other length. In this manner, it can be determined whether the mass adjusting part 50 is positioned at the predetermined position based on whether the fixed clip 55 can be attached, and therefore, the positioning confirmation can easily be performed.

Particularly, in this embodiment, although the movable part 20b cannot be inserted into the press-fit portion 2b, since the movable part 20b of the assemblable dynamic absorber 20B can be formed by post-attaching the mass adjusting part 50, even if the two dynamic absorbers 20A and 20B are formed integrally, the mass adjusting part 50 can be attached without any influence on the piston pin 2.

Each of the supporting parts 20c of the dynamic absorbers 20A and 20B corresponds to a spring supporting the movable part 20b (here, the mass of the movable part 20b is m [unit: kg]), and when the spring constant is k (unit: N/m), in order to suppress the resonation, basically the value of k/m is made substantially the same as K/M. The length and the diameter of the movable part 20b and the length and the diameter of the supporting part 20c are set to obtain such a value of k/m. Technically, the mass of the supporting part 20c needs to be taken into consideration, but since the mass of the supporting part 20c is significantly less than that of the movable part 20b, the mass of the supporting part 20c can be ignored. Note that in a case where the vibration is allowed to increase at frequencies other than the resonance frequency, the value of k/m does not need to be substantially the same as that of K/M.

It is preferred that the spring constants of the two dynamic absorbers 20 (supporting parts 20c) are made different from each other while having the masses of the movable parts 20b of the two dynamic absorbers 20 substantially the same as each other. This is because, not only the vibration at the resonance frequency, but the vibration in a comparatively wide frequency range including the resonance frequency can also be reduced by making the spring constants different. To make the spring constants of the two dynamic absorbers 20 different from each other, one or both of the lengths and the diameters of the supporting parts 20c of the two dynamic absorbers 20 are made different from each other. Alternatively, the materials of the supporting parts 20c of the two dynamic absorbers 20 may be made different. Note that the spring constants of the two dynamic absorbers 20 may be made substantially the same.

In the case of making the spring constants of the two dynamic absorbers 20 different, for example, the spring constant of one of the dynamic absorbers 20 is set such that the value of k/m becomes substantially the same as that of K/M, and the spring constant of the other dynamic absorber 20 is set to be larger or smaller than the spring constant of the one of the dynamic absorbers 20.

As described above, on the combustion stroke, the lubricant film between the piston pin 2 and the pin insertion hole 10d of the connecting rod 10 (the spring coupling the piston pin 2 to the smaller end part 10a of the connecting rod 10) and the lubricant films between the piston pin 2 and the pin supporting holes 1d of the boss parts 1c of the piston 1 (the springs coupling the piston pin 2 to the piston 1) are all eliminated, and as a result, the piston 1, the piston pin 2, and the smaller end part 10d of the connecting rod 10 resonate integrally with respect to the larger end part 10b. However, in this embodiment, the resonance is suppressed by the dynamic absorbers 20 provided to the piston pin 2 and, thus, noises caused by the resonance can be reduced.

On the other hand, on the intake stroke, the compression stroke, and the exhaust stroke, the lubricant films respectively exist between the piston pin 2 and the pin insertion hole 10d of the connecting rod 10 and between the piston pin 2 and each of the pin insertion holes 1d of the boss parts 1c of the piston 1. As a result, such resonance that is caused on the combustion stroke does not occur. If the dynamic absorbers 20 are provided to the smaller end part 10a of the connecting rod 10, the resonance on the combustion stroke can be suppressed; however, the dynamic absorbers 20 vibrate on the intake stroke, the compression stroke, and the exhaust stroke where the resonance does not occur. Therefore, on the intake stroke, the compression stroke, and the exhaust stroke, the noises become louder due to the vibration of the dynamic absorbers 20. However, in this embodiment, since the dynamic absorbers 20 are provided to the piston pin 2, on the intake stroke, the compression stroke, and the exhaust stroke, the lubricant film between the piston pin 2 and the pin insertion hole 10d of the connecting rod 10 (the spring coupling the piston pin 2 to the smaller end part 10a of the connecting rod 10) prevents the vibration of the dynamic absorbers 20 from being transmitted to the connecting rod 10, and the noises do not become louder due to the vibration of the dynamic absorbers 20. Moreover, by providing the dynamic absorbers 20 inside the piston pin 2, space can effectively be utilized and the size increase of the piston 1 is not required.

(Modification of Assemblable Dynamic Absorber)

Figure 6:
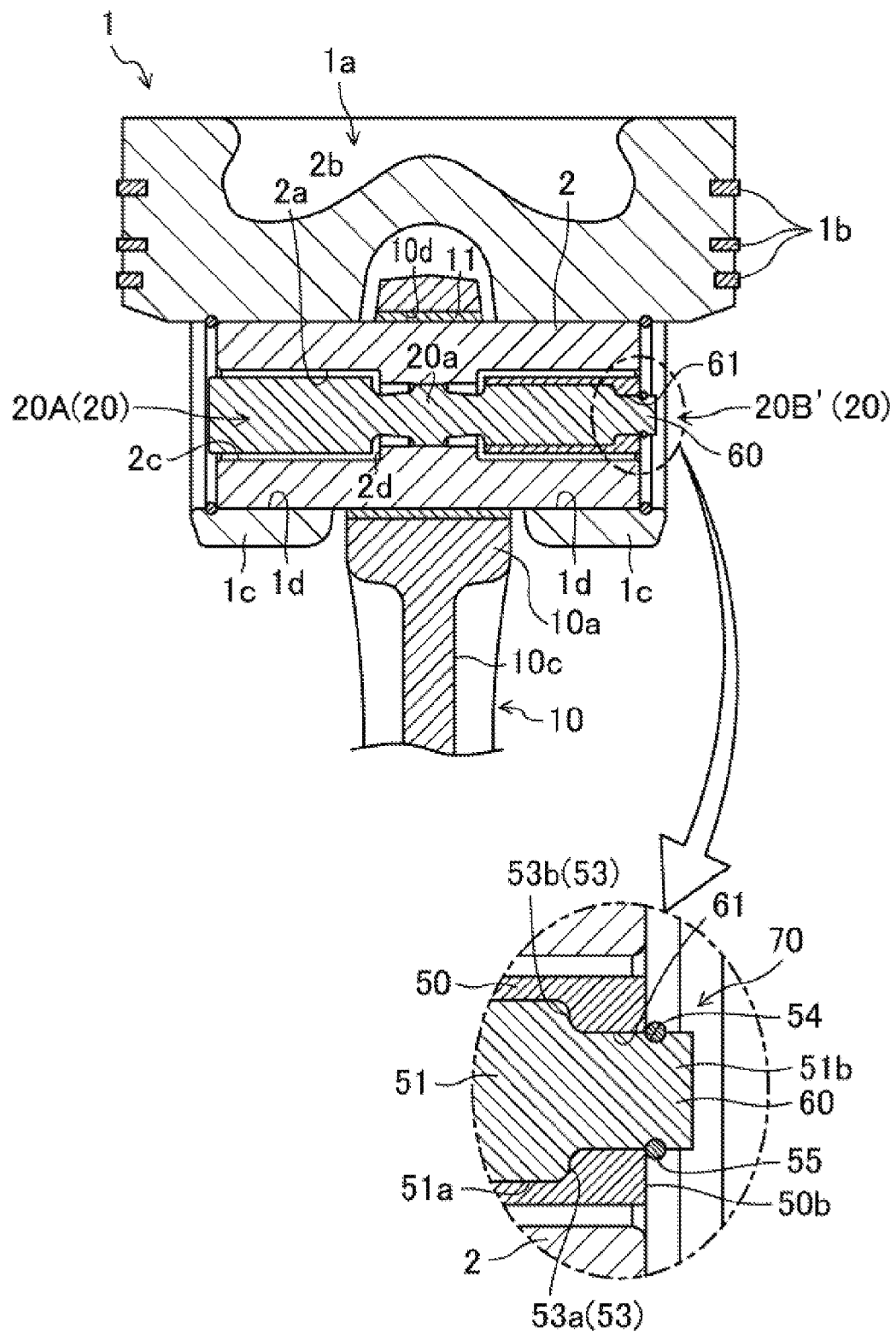
FIG. 6 shows views illustrating a dynamic absorber in a modification in a corresponding manner to FIG. 3.

FIG. 6 illustrates a modification of the assemblable dynamic absorber 20B (assemblable dynamic absorber 20B').

In this modification, the structures of the shaft 51 and the mass adjusting part 50 are different from the above embodiment. Specifically, in the shaft 51, a major portion of the mountable part 51a is formed to have a larger diameter (large-diameter shaft part) than the outer diameter of a base portion thereof. Further, the axial positioning part 53 is located on the tip end side of the mountable part 51a.

A small-diameter shaft part 60 having a relatively small diameter is formed on the tip end side of the mountable part 51a. Corresponding to this, a small-diameter hole portion 61 into which the small-diameter shaft part 60 is fitted is formed in the insertion hole 52. In the axial positioning part 53 of this modification, an end face formed by a step between the large-diameter shaft part and the small-diameter shaft part 60 serves as the restricting face 53a, and an end face of the small-diameter hole portion 61 on the inner side in the axial directions serves as the contact face 53b. Therefore, the annular convex part and the annular concave part are not provided.

In this modification, since the major portion of the mountable part 51a of the shaft 51 has the large diameter, the frequency can be set stably. Moreover, since the thickness of the press-fitting section of the mass adjusting part 50 is thin, the shaft 51 can easily be press-fitted. Therefore, the mountable part 51a can be entirely attached to the mass adjusting part 50 by press-fitting without forming the non-pressure-contact area R in the mountable part 51a, and the mountable part 51a and the mass adjusting part 50 can be integrated more firmly. Thus, the frequency can be set more stably.
(Modification of Retaining Part 70)

In the embodiment and the modification described above, the fixed clip 55 is attached to configure the retaining part 70; however, the present invention is not limited to this. The retaining part 70 can be substituted with anything that can surely prevent the mass adjusting part 50 from being removed from the shaft 51.

For example, a retaining part 70' can be formed by crimping the shaft 51 or the mass adjusting part 50. Using the retaining part 70' is advantageous in that increases in assembly work and the number of members compared to the retaining part 70 in the above embodiment can be avoided.
(First Modification)

Figure 7A:
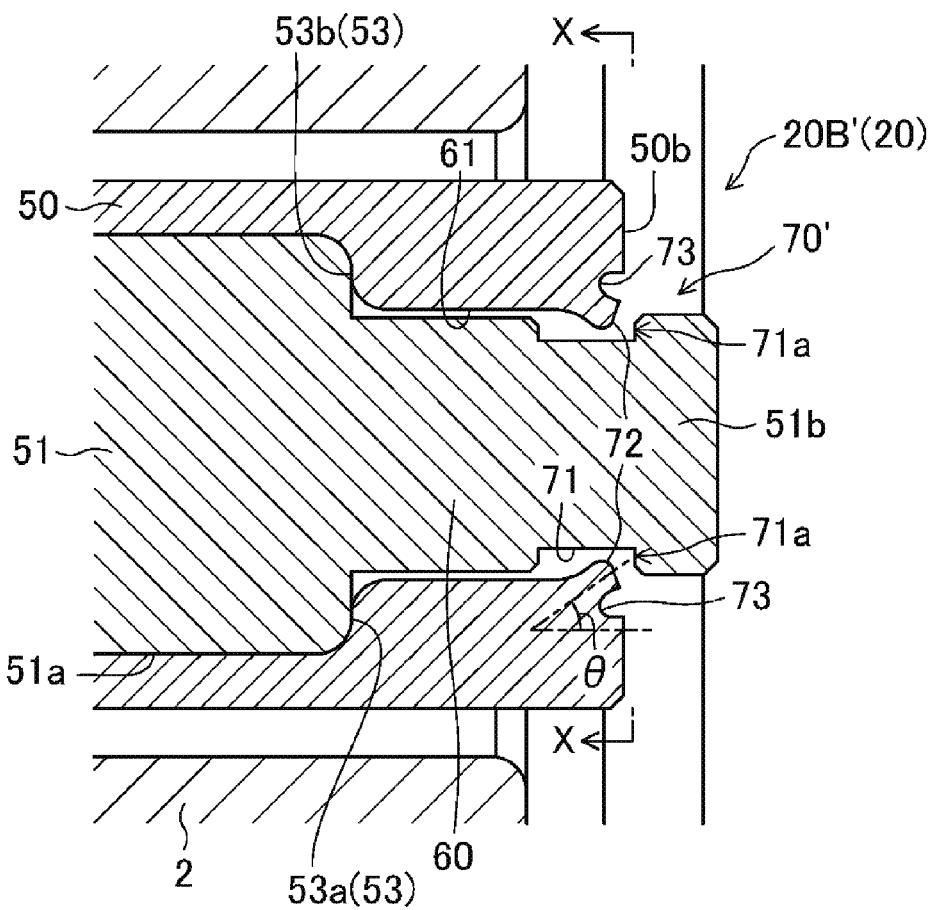
FIG. 7A is a schematic view illustrating a cross-section of a first modification of a retaining part.
Figure 7B:
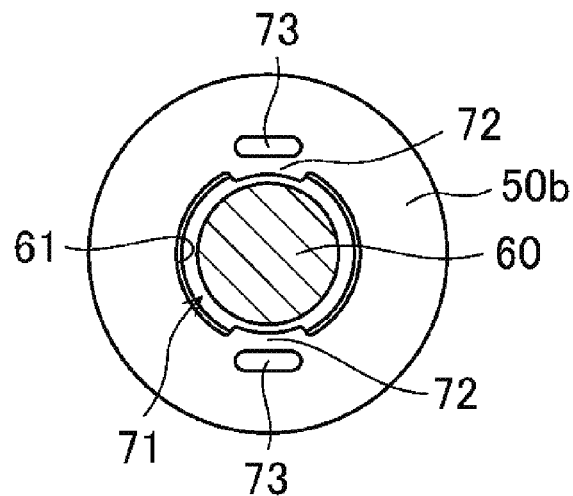
FIG. 7B is a schematic view illustrating a cross-section of the first modification of the retaining part taken along a line X-X in FIG. 7A.

FIGS. 7A and 7B illustrate the retaining part 70' applied to the assemblable dynamic absorber 20B'. The retaining part 70' is formed by crimping the mass adjusting part 50.

Figure 8:
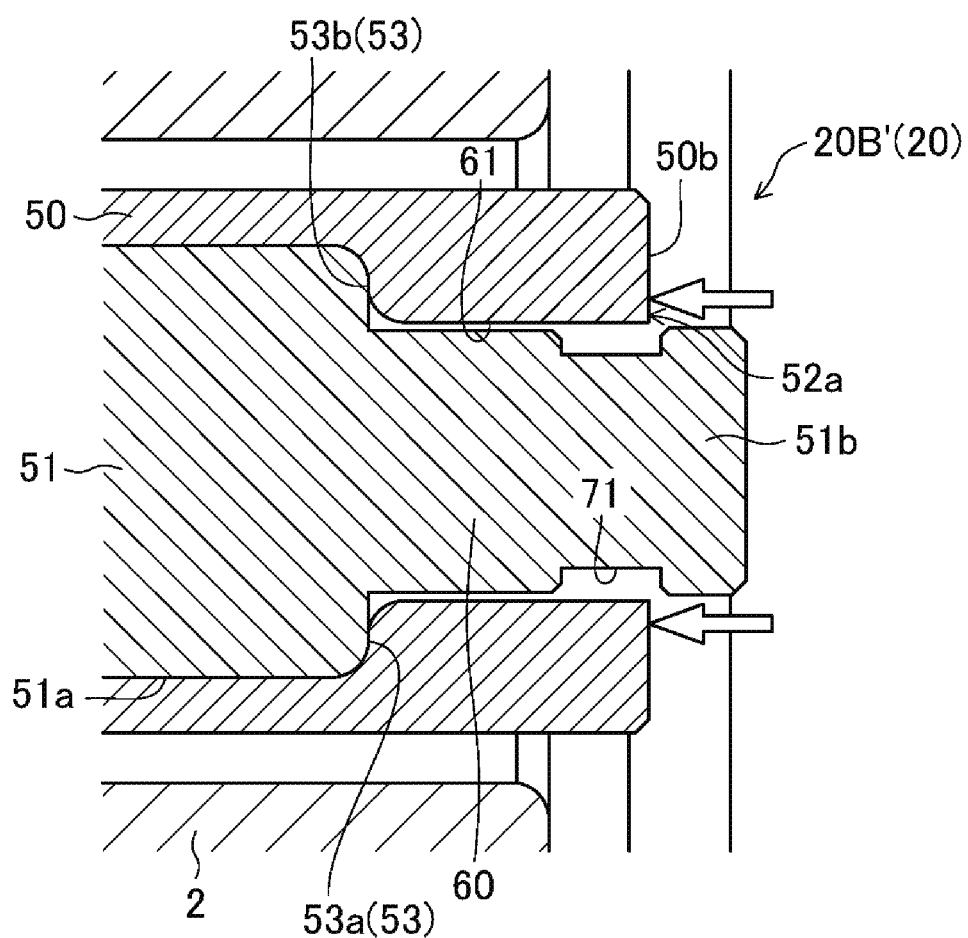
FIG. 8 is a schematic view illustrating a state of a mass adjusting part before crimping.

Specifically, a wide groove having a rectangular cross-section (annular groove 71) is formed in an entire outer circumferential face of a tip end portion of the small-diameter shaft part 60. As illustrated in FIG. 8, an intermediate section of the annular groove 71 in its width direction is formed to face a position corresponding to an edge portion 52a between the outer end face 50b and the small-diameter hole portion 61. Note that FIG. 8 illustrates a state where the mass adjusting part 50 is positioned.

Further, in the state where the mass adjusting part 50 positioned with respect to the shaft 51 supports the shaft 51 via the dynamic absorber 20 (in this modification, the integrated dynamic absorber 20A) coupled to the assemblable dynamic absorber 20B', the mass adjusting part 50 is crimped by hitting a chisel-like crimping tool (not illustrated) on the outer end face 50b in the inserting direction as indicated by the arrows in FIG. 8.

Here, the restricting face 53a formed by the step between the small-diameter shaft part 60 and the large-diameter shaft part is located near the section where the retaining part 70' is formed, but closer to the base end side of the shaft 51 compared to the section where the retaining part 70' is formed. Thus, the restricting face 53a can bear the load added during the crimping, and the mass adjusting part 50 can be supported stably.

In this manner, in a part of the outer end face 50b near the small-diameter hole portion 61, two positions opposite to each other in the radial directions are partially crimped toward the axis to form, in the mass adjusting part 50, two crimped parts 72 projecting inward of the small-diameter hole portion 61. Moreover, the outer end face of the mass adjusting part 50 is also formed with two concaves 73 formed due to the formation of the crimped parts 72.

The crimped parts 72 are inclined toward the axis of the small-diameter hole portion 61 in a state where their tip ends are oriented in a direction to which the mass adjusting part 50 slips out from the shaft 51 (removing direction). Each inclined angle θ is an acute angle, substantially between 10° and 45°.

A tip end portion of each crimped part 72 is in the annular groove 71, and when the crimped part 72 is displaced in the removing direction, the tip end portion of the crimped part 72 hits a side face of the annular groove 71 (inhibiting part 71a).

Note that when it is in the annular groove 71, a gap may exist between the tip end portion of the crimped part 72 and the annular groove 71. Alternatively, it may be such that the gap hardly exists or they contact with each other. In this manner, the positioning accuracy can be improved.

By forming the retaining part 70' with the crimped parts 72 and the inhibiting part 71a as described above, even if the mass adjusting part 50 is displaced in the removing direction, since each crimped part 72 hits the inhibiting part 71a to stop the displacement, the removal of the mass adjusting part 50 from the shaft 51 can surely be prevented.

Additionally, since each crimped part 72 is inclined in the removing direction at an acute angle, when it hits the inhibiting part 71a, the crimped part 72 is tensed by the inhibiting part 71a. Therefore, the removal of the mass adjusting part 50 from the shaft 51 can more surely be prevented.

Moreover, even in a case where a strong force acts on the crimped parts 72 in the inserting direction and the crimped parts 72 are deformed, the tip end portion of each crimped part 72 hits a bottom face of the annular groove 71 in the state where it inclines at an acute angle. Therefore, the removal of the mass adjusting part 50 from the shaft 51 can be prevented even more securely.
(Second Modification)

Figure 9:
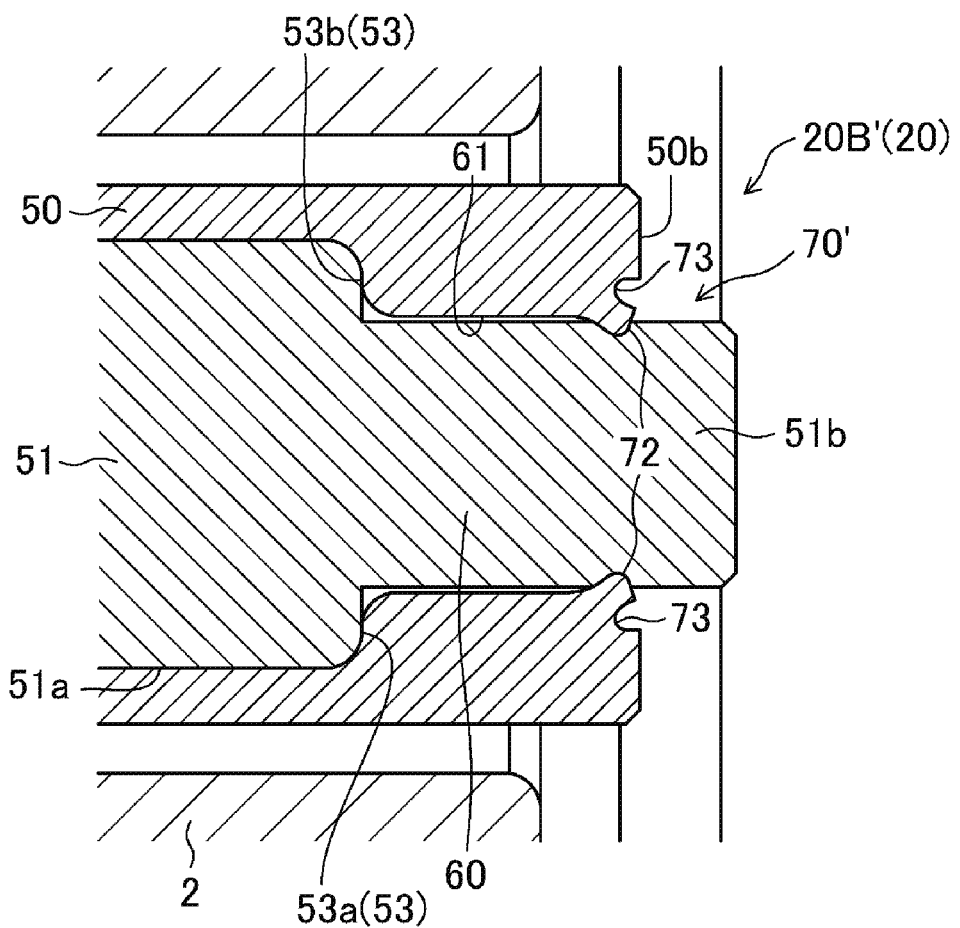
FIG. 9 is a schematic view illustrating a second modification of the retaining part.

FIG. 9 illustrates another modification of forming the retaining part by crimping the mass adjusting part 50. This modification is different from the first modification in that the annular groove 71 is not formed in the shaft 51.

In this modification, the retaining part 70' is formed by inclining the crimped parts 72 to bite into the outer face of the small-diameter shaft part 60. This is advantageous in that the integration of the shaft 51 with the mass adjusting part 50 becomes firmer.
(Third Modification)

Figure 10:
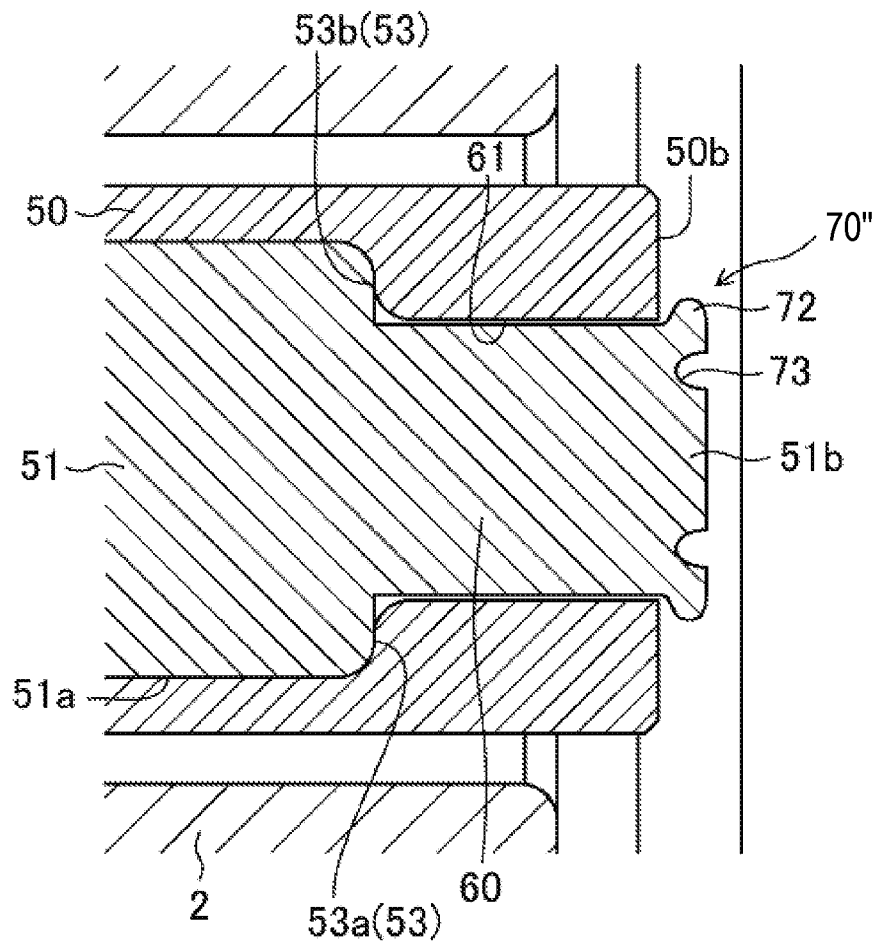
FIG. 10 is a schematic view illustrating a third modification of the retaining part.

FIG. 10 illustrates a retaining part 70" formed by crimping the protruding tip end part 51b of the shaft 51. In this case, by crimping a tip end face of the protruding tip end part 51b, crimped parts 72 projecting outward in the radial directions from its edges are formed.
(Other Modifications)

In the present invention, the retaining part is not limited to the above embodiment, and may be substituted without deviating from the spirit and scope of the following claims.

Figure 11A:
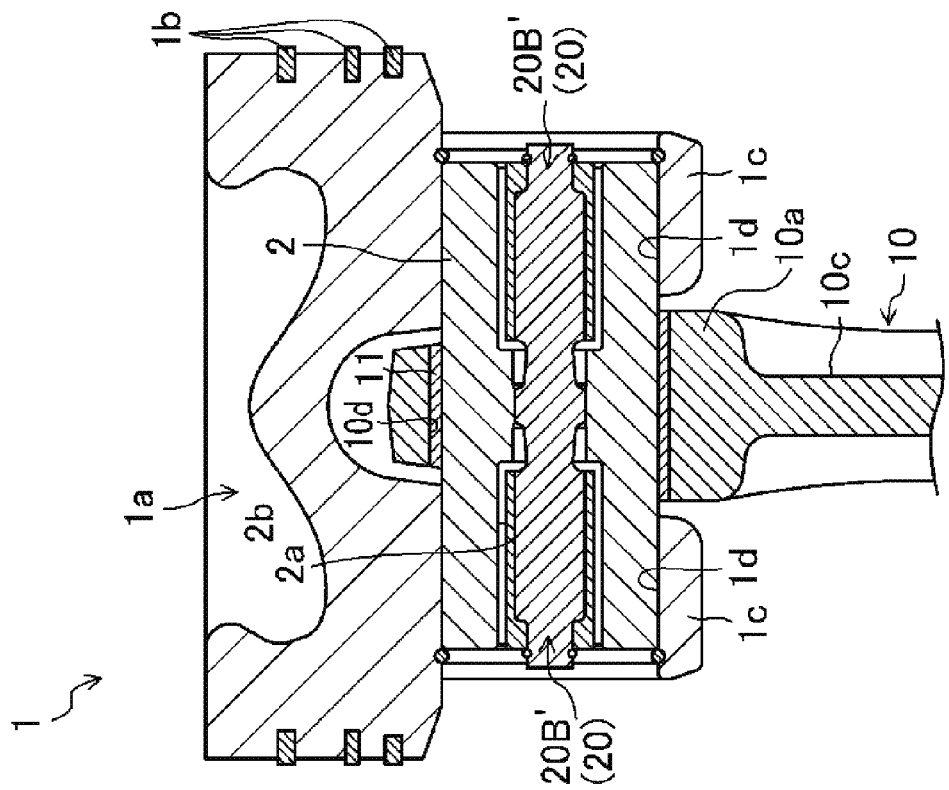
FIGS. 11A and 11B are views illustrating modifications of the piston structure in a corresponding manner to FIG. 3.
Figure 11B:
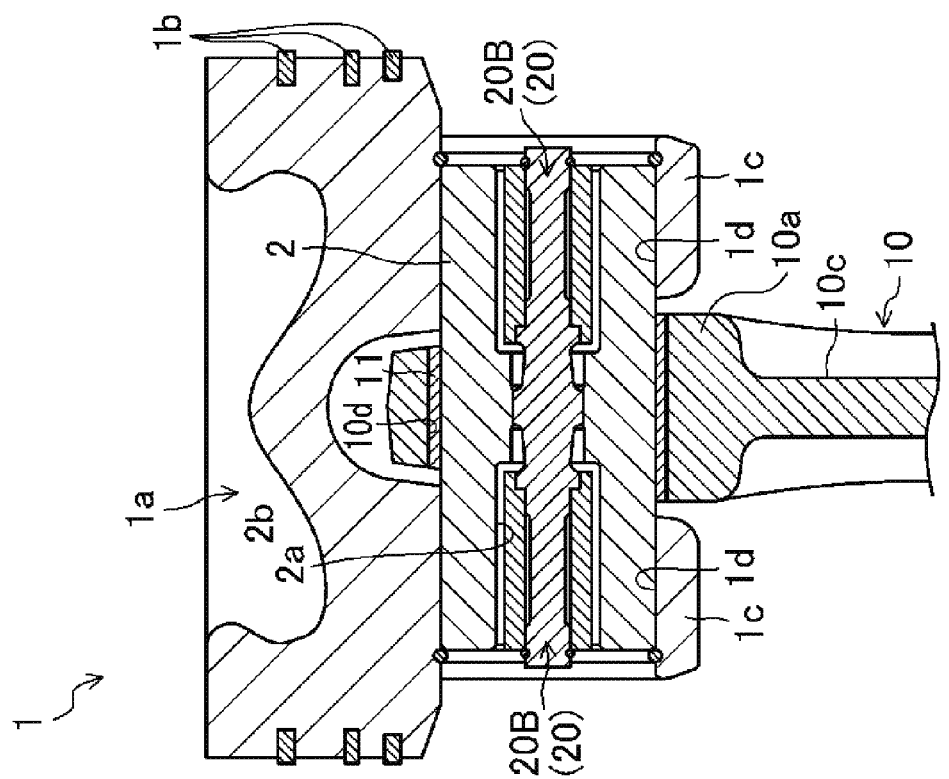

For example, as illustrated in FIG. 11A, both the two dynamic absorbers 20 may be the assemblable dynamic absorbers 20B or, as illustrated in FIG. 11B, both the two dynamic absorbers 20 may be the assemblable dynamic absorbers 20W. In both of the cases, since the piston structure becomes bilaterally symmetric, the structure is simplified and the manufacturing thereof becomes easy. Moreover, since the same members can be used for both of the absorbers, the number of members can be reduced. Furthermore, the degree of freedom in setting the frequency increases.

Further, in the above embodiment, the fixed parts 20a of the two dynamic absorbers 20 are formed integrally; however, the fixed parts 20a of the two dynamic absorbers 20 may be formed separately and each of two dynamic absorbers 20 may be independent. In this case, the two dynamic absorbers 20, similarly to the above embodiment, may be arranged inside the piston pin 2 so that the fixed parts 20*a* are located closer to the center of the piston pin 2 in the axial directions compared to the movable parts 20*b*. Alternatively, as illustrated in FIG. 12, the two dynamic absorbers 20 may be arranged inside the piston pin 2 so that the movable parts 20*b* are located closer to the center of the piston pin 2 in the axial directions compared to the fixed parts 20*a*.

Figure 12:
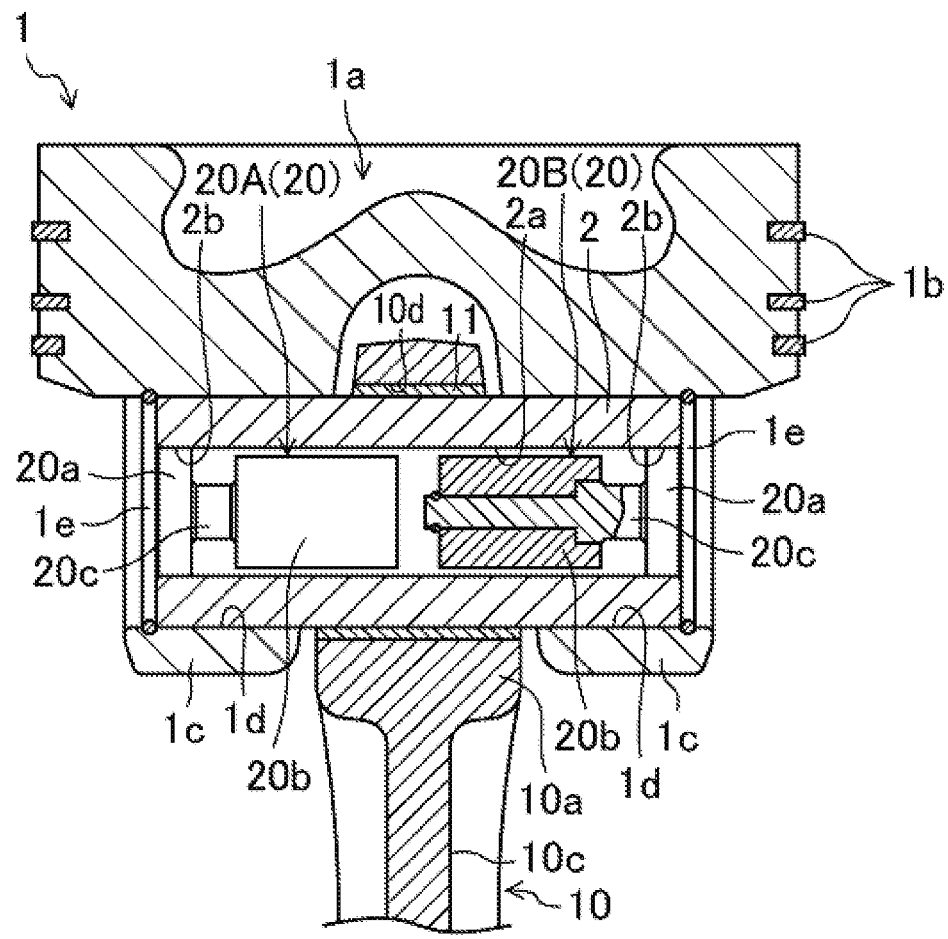
FIG. 12 is a view illustrating another modification of the piston structure in a corresponding manner to FIG. 3.

In FIG. 12, the two press-fit portions 2*b* are respectively formed in the inner circumferential face of the penetration hole 2*a* of the piston pin 2, at positions corresponding to both the end portions of the piston pin 2 in the axial directions (the inner diameters of the penetration hole 2*a* at the press-fit portions 2*b* are the same as that of the other part of the penetration hole 2*a*). The fixed parts 20*a* of the two dynamic absorbers 20 are respectively fixed by being press-fitted into the two press-fit portions 2*b*.

Moreover, in the above embodiment, the full floating type is adopted for the assembly of the piston pin 2; however, it is not limited to this, and a semi-floating type in which the piston pin 2 is turnable within the pin insertion hole 10*d* of the connecting rod 10 and is fixed to the pin supporting holes 1*d* of the boss parts 1*c* of the piston 1 may be adopted.

Regarding the retaining part, the number of crimped parts is not limited to two, and may be three or more. The modifications of the crimped parts described above are not limited only for the assemblable dynamic absorber 20B', and can also be applied to the assemblable dynamic absorber 20B, and can also be applied to the piston structures illustrated in FIGS. 11 and 12.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Piston
2 Piston Pin
10 Connecting Rod
10*a* Smaller End Part
10*b* Larger End Part
20 Dynamic Absorber
20*a* Fixed Part
20*b* Movable Part
20*c* Supporting Part
50 Mass Adjusting Part
51 Shaft
53 Axial Positioning Part
70, 70', 70" Retaining Part
71 Annular Groove
71*a* Inhibiting Part
72 Crimped Part

What is claimed is:

1. A piston structure for an engine, comprising:
   a piston for reciprocating within a cylinder;
   a connecting rod having a smaller-end part and a larger-end part in both ends, respectively, the smaller-end part coupled to the piston, the larger-end part coupled to a crankshaft;
   a cross-sectionally hollow piston pin coupling the piston to the smaller-end part; and
   a dynamic absorber provided inside the piston pin, including a fixed part fixed to the piston pin and a movable part pivotally supported by the fixed part, and for suppressing the piston, the piston pin, and the smaller-end part from integrally resonating with respect to the larger-end part of the connecting rod on combustion stroke,
   wherein the dynamic absorber includes an assemblable dynamic absorber in which the movable part is formed by attaching a mass adjusting part to the fixed part.

2. The piston structure of claim 1, wherein the dynamic absorber includes two dynamic absorbers, and
   wherein the two dynamic absorbers are located sandwiching therebetween a plane passing through the center of the piston pin in an axial direction thereof.

3. The piston structure of claim 2, wherein one of the dynamic absorbers is the assemblable dynamic absorber, and the other dynamic absorber is an integrated dynamic absorber in which the fixed part and the movable part are formed integrally.

4. The piston structure of claim 2, wherein both of the dynamic absorbers are the assemblable dynamic absorbers.

5. The piston structure of claim 1, wherein the fixed part has a shaft extending in an axial direction of the piston pin,
   wherein the mass adjusting part has an insertion hole into which the shaft is inserted,
   wherein the mass adjusting part is attached to the fixed part by inserting the shaft into the insertion hole, and
   wherein an axial positioning part for positioning the mass adjusting part with respect to the shaft is provided between the insertion hole and the shaft.

6. The piston structure of claim 2, wherein the fixed part has a shaft extending in the axial direction of the piston pin,
   wherein the mass adjusting part has an insertion hole into which the shaft is inserted,
   wherein the mass adjusting part is attached to the fixed part by inserting the shaft into the insertion hole, and
   wherein an axial positioning part for positioning the mass adjusting part with respect to the shaft is provided between the insertion hole and the shaft.

7. The piston structure of claim 3, wherein the fixed part has a shaft extending in the axial direction of the piston pin,
   wherein the mass adjusting part has an insertion hole into which the shaft is inserted,
   wherein the mass adjusting part is attached to the fixed part by inserting the shaft into the insertion hole, and
   wherein an axial positioning part for positioning the mass adjusting part with respect to the shaft is provided between the insertion hole and the shaft.

8. The piston structure of claim 4, wherein the fixed part has a shaft extending in the axial direction of the piston pin,
   wherein the mass adjusting part has an insertion hole into which the shaft is inserted,
   wherein the mass adjusting part is attached to the fixed part by inserting the shaft into the insertion hole, and
   wherein an axial positioning part for positioning the mass adjusting part with respect to the shaft is provided between the insertion hole and the shaft.

9. The piston structure of claim 5, wherein the axial positioning part includes a restricting face provided to the shaft to face an inserting direction of the mass adjusting part, and a contact face for contacting with the restricting face and provided to the mass adjusting part, and
   wherein the restricting face is located on a tip end side of the shaft.

10. The piston structure of claim 1, wherein the fixed part has a shaft extending in an axial direction of the piston pin, wherein the mass adjusting part has an insertion hole into which the shaft is inserted, wherein the mass adjusting part is attached to the fixed part by inserting the shaft into the insertion hole, and wherein a retaining part for preventing the mass adjusting part from being removed from the shaft is provided between the mass adjusting part and a protruding tip end part formed in the shaft to protrude beyond the mass adjusting part.

11. The piston structure of claim 2, wherein the fixed part has a shaft extending in the axial direction of the piston pin, wherein the mass adjusting part has an insertion hole into which the shaft is inserted, wherein the mass adjusting part is attached to the fixed part by inserting the shaft into the insertion hole, and wherein a retaining part for preventing the mass adjusting part from being removed from the shaft is provided between the mass adjusting part and a protruding tip end part formed in the shaft to protrude beyond the mass adjusting part.

12. The piston structure of claim 3, wherein the fixed part has a shaft extending in the axial direction of the piston pin, wherein the mass adjusting part has an insertion hole into which the shaft is inserted, wherein the mass adjusting part is attached to the fixed part by inserting the shaft into the insertion hole, and wherein a retaining part for preventing the mass adjusting part from being removed from the shaft is provided between the mass adjusting part and a protruding tip end part formed in the shaft to protrude beyond the mass adjusting part.

13. The piston structure of claim 4, wherein the fixed part has a shaft extending in the axial direction of the piston pin, wherein the mass adjusting part has an insertion hole into which the shaft is inserted, wherein the mass adjusting part is attached to the fixed part by inserting the shaft into the insertion hole, and wherein a retaining part for preventing the mass adjusting part from being removed from the shaft is provided between the mass adjusting part and a protruding tip end part formed in the shaft to protrude beyond the mass adjusting part.

14. The piston structure of claim 10, wherein the retaining part is structured by attaching a fixed clip to the protruding tip end part.

15. The piston structure of claim 10, wherein the retaining part is formed by crimping the protruding tip end part.

16. The piston structure of claim 10, wherein the retaining part is formed by crimping the mass adjusting part.

17. The piston structure of claim 16, wherein the retaining part includes a crimped part formed by crimping the mass adjusting part, and an inhibiting part provided in an outer face of the shaft so as to be in contact with the crimped part when the mass adjusting part is displaced in a removing direction thereof.

18. The piston structure of claim 16, wherein a restricting face facing in an inserting direction of the mass adjusting part and for contacting with the mass adjusting part is formed in the shaft at a position near the retaining part and closer to a base end side of the shaft than the retaining part.

19. The piston structure of claim 17, wherein a restricting face facing in an inserting direction of the mass adjusting part and for contacting with the mass adjusting part is formed in the shaft at a position near the retaining part and closer to a base end side of the shaft than the retaining part.

* * * * *